United States Patent [19]

Detering et al.

[11] Patent Number: 5,677,384
[45] Date of Patent: Oct. 14, 1997

[54] GRAFTED POLYAMIDOAMINES AND GRAFTED POLYETHYLENEIMINES, PREPARATION THEREOF, AND USE THEREOF AS DETERGENT ADDITIVES

[75] Inventors: Juergen Detering, Limburgerhof; Christian Schade; Knut Oppenlaender, both of Ludwigshafen; Michael Zirnstein, Schriesheim; Guenter Scherr; Wolfgang Trieselt, both of Ludwigshafen; Volker Schwendemann, Neustadt, all of Germany

[73] Assignee: BASF Aktiengesellschaft, Ludwigshafen, Germany

[21] Appl. No.: 513,800

[22] PCT Filed: Jun. 3, 1994

[86] PCT No.: PCT/EP94/01801

§ 371 Date: Sep. 7, 1995

§ 102(e) Date: Sep. 7, 1995

[87] PCT Pub. No.: WO94/29422

PCT Pub. Date: Dec. 22, 1994

[30] Foreign Application Priority Data

Jun. 16, 1993 [DE] Germany ............... 43 19 934.8

[51] Int. Cl.$^6$ ........................................... C08L 77/00

[52] U.S. Cl. ............... 525/281; 134/201; 252/344; 252/DIG. 2; 252/542; 525/279; 525/417; 525/421; 525/426; 525/434; 525/435; 525/436

[58] Field of Search ........................... 525/426, 435, 525/434, 421, 436, 417, 279, 281; 734/201; 252/542, 544, DIG. 2

[56] References Cited

U.S. PATENT DOCUMENTS 5,122,577  6/1992  Noda ........................... 524/426
5,274,028  12/1993  Bertrand et al. ............... 525/17

*Primary Examiner*—Ana Woodward
*Attorney, Agent, or Firm*—Oblon, Spivak, McClelland, Maier & Neustadt, P.C.

[57] ABSTRACT

Grafted polyamidoamines and grafted polyethyleneimines obtainable by free-radically initiated polymerization of (a) 1-vinylpyrrolidone, 1-vinyltriazole, 1-vinylimidazoles, mixtures of said monomers or mixtures of at least one of said monomers with up to 20% by weight of other monoethylenically unsaturated monomers in the presence of (b) water-soluble or -dispersible polyamidoamines, polyethyleneimines or mixtures thereof in a weight ratio of (a):(b) from 5:95 to 95:5, are useful as dye transfer inhibitors in surfactant-based detergents when included therein in an amount from 0.05 to 10% by weight.

5 Claims, No Drawings

GRAFTED POLYAMIDOAMINES AND GRAFTED POLYETHYLENEIMINES, PREPARATION THEREOF, AND USE THEREOF AS DETERGENT ADDITIVES

The present invention relates to polyamidoamines and polyethyleneimines grafted with 1-vinylpyrrolidone, 1-vinyltriazole and/or 1-vinylimidazoles, their preparation by free-radically initiated polymerization of 1-vinylpyrrolidone, 1-vinyltriazole and/or 1-vinylimidazoles in the presence of polyamidoamines and/or polyethyleneimines, the use of the grafted polyamidoamines and polyethyleneimines thus obtainable in detergents, and detergents containing the grafted products.

DE-B-22 32 353 discloses washing and cleaning compositions which consist essentially of from 95 to 60% by weight of nonionic detergents and from 5 to 40% by weight of a partially or completely water-soluble polyvinylpyrrolidone and which are essentially free of anionic surfactants. The vinylpyrrolidone polymer prevents the transfer of dye from colored to white textiles during washing. The vinylpyrrolidone polymer has a molecular weight within the range from about 10,000 to about 1,000,000. Both homopolymers and copolymers of vinylpyrrolidone are suitable. Suitable comonomers mentioned are acrylonitrile or maleic anhydride. However, the effectiveness of the vinylpyrrolidone polymer as a color transfer inhibitor is strongly impaired by anionic surfactants.

DE-A-28 14 287 discloses washing and cleaning compositions which contain anionic and/or nonionic surfactants, builders and other customary detergent additives and also, as stain inhibitors, from 0.1 to 10% by weight of water-soluble or -dispersible homo- or copolymers of N-vinylimidazole. In 1% strength by weight aqueous solution at 20° C. the polymers have a specific viscosity from 0.01 to 5.

The abovementioned polymers have the disadvantage that they are neither biodegradable nor removable from the waste water by adsorption on sewage sludge.

The earlier but as yet unpublished DE application P 4 244 386.5 discloses copolymers which are obtainable by free-radically initiated copolymerization of mixtures of (a) 20–95% by weight of 1-vinylpyrrolidone and/or 1-vinylimidazoles, and (b) 5–80% by weight of water-insoluble polymers containing in the molecule at least one ethylenically unsaturated double bond and/or a mercapto group.

These copolymers are used as detergent additives for inhibiting the transfer of dye during the washing process. They are eliminable from the waste water by adsorption on sewage sludge.

EP-A-0 068 232 discloses liquid detergents containing nonionic or cationic surfactants combined with polyethyleneimines, polyamines, polyamidoamides or polyacrylamides. The detergents are free of textile-softening quaternary ammonium compounds and are also essentially phosphate-free. The polymers present in the liquid detergents are intended to suppress or prevent the transfer of dye from colored to uncolored textiles during the washing process. However, their effectiveness is relatively low.

It is an object of the present invention to provide novel compounds which are suitable for use as detergent additives and substantially suppress or prevent any transfer of dye from colored to uncolored textiles during the washing process and are eliminable from the waste water.

We have found that this object is achieved according to the invention by grafted polyamidoamines and grafted polyethyleneimines obtainable by free-radically initiated polymerization of (a) 1-vinylpyrrolidone, 1-vinyltriazole, 1-vinylimidazoles of the formula

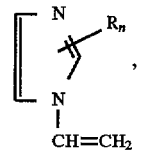

where R is H, $CH_3$ or $C_2H_5$ and n is from 1 to 3, mixtures of said monomers or mixtures of at least one of said monomers with up to 20% by weight of other monoethylenically unsaturated monomers in the presence of (b) water-soluble or -dispersible polyamidoamines, polyethyleneimines or mixtures thereof in a weight ratio of (a):(b) from 5:95 to 95:5.

The present invention also provides a process for preparing grafted polyamidoamines and grafted polyethyleneimines, which comprises free-radically polymerizing (a) 1-vinylpyrrolidone, 1-vinyltriazole, 1-vinylimidazoles of the formula

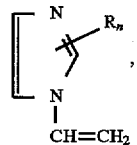

where R is H, $CH_3$ or $C_2H_5$ and n is from 1 to 3, mixtures of said monomers or mixtures of at least one of said monomers with up to 20% by weight of other monoethylenically unsaturated monomers in the presence of (b) water-soluble or -dispersible polyamidoamines, polyethyleneimines or mixtures thereof in a weight ratio of (a):(b) from 5:95 to 95:5.

The grafted polyamidoamines and polyethyleneimines thus obtainable are used as detergent additives for inhibiting dye transfer during washing.

Monomers of group (a) are 1-vinylpyrrolidone, 1-vinyltriazole and 1-vinylimidazoles of the formula

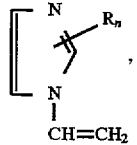

where R is H, $CH_3$ or $C_2H_5$ and n is from 1 to 3. In the formula I the substituent R can be disposed on the imidazole ring in position 2, 4 or 5. Examples of suitable compounds include 1-vinylimidazole, 1-vinyl-2-methylimidazole, 1-vinyl-2,4-dimethylimidazole, 1-vinyl-2,4,5-trimethylimidazole, 1-vinyl-2-ethylimidazole, 1-vinyl-4,5-diethylimidazole and 1-vinyl-2,4,5-triethylimidazole. It is also possible to use mixtures of said monomers in any ratio, for example mixtures of 1-vinylpyrrolidone and 1-vinylimidazole or mixtures of 1-vinylimidazole and 1-vinyl-2-methylimidazole.

The monomers of group (a) can be used in the polymerization either alone or mixed with one another with up to 20% by weight of other monoethylenically unsaturated monomers. These are preferably monomers which contain a basic nitrogen atom, either in the form of the free bases or in quaternized form, and monomers which have an amido group which may be substituted. Suitable monomers of this kind include for example N,N'-dialkylaminoalkyl (meth)

acrylates, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, dimethylaminobutyl methacrylate, dimethylaminoneopentyl acrylate, dimethylaminoneopentyl methacrylate. Further suitable basic monomers of this group are N,N'-dialkylaminoalkyl(meth)acrylamides, for example N,N,-di-$C_1$–$C_3$-alkylamino. $C_2$–$C_6$-alkyl(meth)acrylamides, such as dimethylaminoethylacrylamide, dimethylaminoethylmethacrylamide, diethylaminoethylacrylamide, diethylaminoethylmethacrylamide, dipropylaminoethylacrylamide, dipropylaminoethylmethacrylamide, dimethylaminopropylacrylamide, dimethylaminopropylmethacrylamide, diethylaminopropylacrylamide, diethylaminopropylmethacrylamide, dimethylaminoneopentylacrylamide, dimethylaminoneopentylmethacrylamide and dialkylaminobutylacrylamide. Further suitable monomers of this group are 4-vinylpyridine, 2-vinylpyridine and/or diallyl(di)alkylamines in which the alkyl group has from 1 to 12 carbon atoms.

The abovementioned basic monomers are used in the copolymerization in the form of the free bases, in the form of the salts with organic or inorganic acids, or in quaternized form. Suitable for salt formation are, for example carboxylic acids having from 1 to 7 carbon atoms, eg. formic acid, acetic acid or propionic acid, benzenesulfonic acid, p-toluenesulfonic acid or inorganic acids such as hydrohalic acids, eg. hydrochloric acid or hydrobromic acid. The above-exemplified basic monomers can also be used in quaternized form. Suitable quaternizing agents are for example alkyl halides having from 1 to 18 carbon atoms in the alkyl group, eg. methyl chloride, methyl bromide, methyl iodide, ethyl chloride, propyl chloride, hexyl chloride, dodecyl chloride, lauryl chloride and benzyl halides, in particular benzyl chloride and benzyl bromide. The quaternization of the nitrogen-containing basic monomers can also be effected by reacting them with dialkyl sulfates, in particular diethyl sulfate or dimethyl sulfate. Examples of quaternized monomers of this group are trimethylammoniumethyl methacrylate chloride, dimethylethylammoniumethyl methacrylate ethylsulfate and dimethylethylammoniumethylmethacrylemide ethylsulfate. Further suitable monomers are 1-vinylimidazolium compounds of the formula

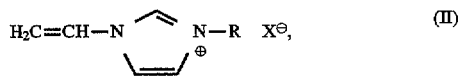

(II)

where R is H, $C_1$–$C_{18}$-alkyl or benzyl and $X^{\ominus}$ is an anion.

The anion can be a halogen ion or else the radical of an inorganic or organic acid. Examples of quaternized 1-vinylimidazoles of the formula I are 3-methyl-1-vinylimidazolium chloride, 3-benzyl-1-vinylimidazolium chloride, 3-n-dodecyl-1-vinylimidazolium bromide and 3-n-octadecyl-1-vinylimidazolium chloride.

If the abovementioned monomers are used together with vinylpyrrolidone, vinyltriazole or the vinylimidazoles, they are preferably present in the mixture in an amount from 1 to 18% by weight. The monomers of group (a) are used in the copolymerization in amounts from 5 to 95, preferably from 30 to 90, % by weight, based on the compounds of groups (a) and (b).

Suitable compounds of group (b) are water-soluble or water-dispersible polyamidoamines or polyethyleneimines and also mixtures of these two classes of compounds.

Water-soluble or -dispersible polyamidoamines are long known. They are described for example in U.S. Pat. No. 4,144,123 as starting materials for preparing retention and drainage aids for papermaking. The polyamidoamines are obtainable for example by condensing 1) diamines and/or polyalkylenepolyamines with
2) at least dibasic carboxylic acids, up to 50 mol % of which may be replaced by monobasic amino acids, monobasic hydroxycarboxylic acids and/or monobasic carboxylic acids, in a molar ratio of (1):(2) from 1:0.5 to 1:2.

Suitable for use as component (1) are diamines and/or polyalkylenepolyamines. Suitable diamines are for example ethylenediamine, propylenediamine, 1,4-diaminobutane, 1,6-hexamethylenediamine, neopentanediamine, 4,4'-diaminodiphenylmethane, 4,4'-diaminodicyclohexylmethane, 3,3'-dimethyl-4,4'-diaminodiphenylmethane and phenylenediamine. Suitable diamines also include α,ω-diamino compounds of polyalkylene oxides. The polyalkylene oxides are derived from ethylene oxide, propylene oxide or butylene oxides or from polytetrahydrofuran. They customarily contain from 2 to 100, preferably from 3 to 50, alkylene oxide units. The preferred starting materials are polyethylene oxides, polypropylene oxides or block copolymers of ethylene oxide and propylene oxide. The block copolymers may contain ethylene oxide and propylene oxide as copolymerized units in any ratio. The polyalkylene oxides mentioned can be used for example to form the α,ω-diamines suitable for use as component (1) by reacting the polyalkylene oxides with ammonia under superatmospheric pressure. By polyalkylenepolyamines are meant compounds which contain at least 3 basic nitrogen atoms in the molecule, eg. diethylenetriamine, triethylenetetramine, tetraethylenepentamine, pentaethylenehexamine, diaminopropylethylenediamine (N,N'-bis(3-aminopropyl)-1,2-diaminoethane), ethylenepropylenetriamine, trisaminopropylamine and polyethyleneimines, having molecular weights from preferably 300 to 20,000. Preference for use as component (1) is given to diethylenetriamine, 3-(2-aminoethyl)aminopropylamine, dipropylenetriamine and/or N,N'-bis(3-aminopropyl)-1,2-diaminoethane.

Suitable for use as component (2) for preparing polyamidoamines are at least dibasic carboxylic acids which may be replaced up to 50 mol % by monobasic amino acids and/or monobasic hydroxycarboxylic acids. Suitable dibasic carboxylic acids are for example all carboxylic acids having from 2 to 10 carbon atoms such as oxalic acid, malonic acid, succinic acid, tartaric acid, maleic acid, itaconic acid, glutaric acid, adipic acid, suberic acid, sebacic acid, o-phthalic acid and terephthalic acid. Further suitable compounds of component b) are for example butanetetracarboxylic acid, propanetricarboxylic acid and citric acid and also dibasic amino acids such as iminodiacetic acid, aspartic acid and glutamic acid.

The at least dibasic carboxylic acids, ie. carboxylic acids which have at least two carboxyl groups in the molecule, can be replaced up to 50 mol % by monobasic amino acids such as glycine, alanine, valine, leucine, serine, threonine, cysteine or by monobasic hydroxycarboxylic acids or by monobasic carboxylic acids. Suitable monobasic hydroxycarboxylic acids are for example hydroxyacetic acid, lactic acid, hydroxybutyric acid and 6-hydroxyhexanoic acid. It is also possible to use derivatives of hydroxycarboxylic acids, such as lactones, eg. butyrolactone and caprolactone.

Suitable monobasic carboxylic acids are for example benzoic acid, acetic acid, stearic acid, oleic acid, anthranilic acid and nicotinic acid. In the monobasic amino acids the position of the amino group relative to the carboxyl group is not crucial. For instance, as well as α-amino acids mentioned the at least dibasic carboxylic acids can also be replaced up to 50% by monobasic β-, γ-, δ- or ε-amino acids. Of particular industrial interest is also the use of derivatives of such amino acids, for example of caprolactam.

Preference for use as component (2) for preparing polyamidoamines is given to adipic acid, glutaric acid, tartaric acid, citric acid, aspartic acid and/or iminodiacetic acid. Instead of a single at least dibasic dicarboxylic acid it is of course also possible to use in the preparation of the polyamidoamines mixtures of two or more such carboxylic acids, for example mixtures of adipic acid and maleic acid, or mixtures of adipic acid and tartaric acid, or mixtures of adipic acid, citric acid and iminodiacetic acid, or mixtures of adipic acid and iminodiacetic acid.

The polycondensation of components (1) and (2) is carried out by prior art methods by heating components (1) and (2) to temperatures from above 100° to 250° C., preferably from 120° to 200° C., and distilling off the water formed in the course of the condensation. Component (2) is usually used in the form of the free carboxylic acids, but it is also possible to use carboxylic acid derivatives such as anhydrides, esters, amides or halides. Examples of such derivatives are maleic anhydride, succinic anhydride, phthalic anhydride and itaconic anhydride. When the anhydrides are used, the condensation can be carried out at lower temperatures than when carboxylic acids are used. Similarly, when acyl halides are used, such as adipoyl chloride, the condensation can be carried out at lower temperatures. Suitable esters are preferably derived from alcohols having 1 or 2 carbon atoms, eg. dimethyl adipate, diethyl adipate, dimethyl tartrate and dimethyl iminoacetate. Suitable amides are for example adipamide, adipamic acid and glutaramide.

In 30% strength aqueous solution the polyamidoamines have a viscosity from 1 to 2,000, preferably from 5 to 800, mPas (measured at 20° C. in a Physica viscometer using measuring cone 24 and 126 revolutions per minute).

By polyethyleneimines are meant all polymers which are obtained by cationically initiated polymerization of ethyleneimines of the formula

where R is H, $CH_3$, $C_2H_5$,

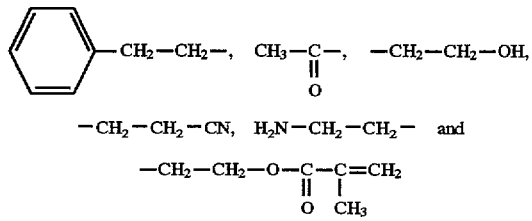

and also the reaction products of the polymers with, for example, ethylene oxide, propylene oxide, dialkyl carbonates such as ethylene carbonate or propylene carbonate, lactones such as butyrolactone, urea, formaldehyde-amine mixtures, carboxylic acids such as formic acid, acetic acid or vinylacetic acid. Such reaction products may contain, based on the polyethyleneimine, up to 400% by weight of ethylene oxide and/or propylene oxide and up to 200% by weight for the other compounds. The compounds of the formula III are polymerized cationically using as the catalyst for example Brønstedt acids such as sulfuric acid, phosphoric acid, p-toluenesulfonic acid or carboxylic acids such as formic acid, acetic acid or propionic acid or Lewis acids such as halides, for example zinc chloride or alkyl halides such as methyl chloride, ethyl chloride, benzyl chloride or ethylene chloride. Suitable polyethyleneimines can also be obtained by reacting ethylene chloride with ammonia and amines. The molecular weights of the polyethyleneamines are within the range from 400 to 200,000, and preferred polyethyleneimines for use as component (b) are obtainable by polymerizing ethyleneimine. Polymers of this kind are commercial products. In addition it is also possible to use polyalkylenepolyamines containing from 10 to 4,500 nitrogen atoms in the molecule.

Further suitable compounds of group (b) are polymers containing in copolymerized format least 50 mol % of a monomer such as 2-methyloxazoline or 2-ethyloxazoline, and also the products obtainable by hydrolysis of these polymers. Such polymers have molecular weights from 400 to 100,000. It is also possible to use as compounds of group (b) polymers obtainable by cationic polymerization of 2-alkyl-5,6-dihydro-4H-1,3-oxazines. The alkyl group in the oxazines can have from 1 to 20 carbon atoms.

The grafted polyamidoamines and polyethyleneimines are prepared by free-radically polymerizing (a) 1-vinylpyrrolidone, 1-vinyltriazole, 1-vinylimidazoles of the formula I, mixtures of said monomers or mixtures of at least one of said monomers with up to 20% by weight of other monoethylenically-unsaturated monomers in the presence of (b) water-soluble or -dispersible polyamidoamines, polyethyleneimines or mixtures thereof in a weight ratio of (a):(b) from 5:95 to 95:5. The polymerization is preferably carried out in a solvent such as water, alcohols or ketones having boiling points of in each case not more than 135° C. or mixtures of said solvents in the presence of free-radical initiators with or without surfactants, protective colloids and/or regulators. The graft polymerization of the compounds of groups (a) and (b) can be carried out by all methods of solution, suspension, emulsion or precipitation polymerization. The concentration of components (a) and (b) in said solvents or diluents is not critical and is advantageously within the range from 1 to 80, preferably from 20 to 60, % by weight. Suitable solvents are for example methanol, ethanol, isopropanol, n-propanol, n-butanol, isobutanol, tert-butanol, methyl acetate, ethyl acetate, isopropyl acetate, n-propyl acetate, methyl propionate, ethyl propionate, methyl ethyl ketone, acetone and diethyl ketone. The organic solvents are distilled off after the graft polymerization has ended, leaving a pulverulent polymer. The organic solvents can also be exchanged for water, so that an aqueous solution or dispersion of the graft polymers is obtained.

The graft polymers are preferably prepared by polymerizing the monomers of group (a) in water in the presence of the polymers of group (b). For this components (a) and (b) can be charged together to a reaction vessel initially in the form of an aqueous solution or a solution in an organic solvent and the reaction be initiated by adding a polymerization initiator. However, the graft copolymerization can also be carried out by first introducing a small amount of a mixture of components (a) and (b) into a polymerization vessel, initiating the copolymerization by addition of an initiator, and then adding components (a) and (b) batchwise or continuously in the particular desired ratio. However, it is also possible to introduce initially the total amount of component (b) and to add the monomers (a) batchwise or continuously. However, it is also possible first to polymerize the monomers (a) substantially, ie. up to 50%, and only then to add the polymers of group (b) to obtain polymers according to the invention.

The graft polymerization is initiated free-radically using initiators which form free radicals under the polymerization conditions. Suitable for this purpose are all customary free-radical initiators, for example peroxy and azo compounds, for example peroxides, hydroperoxides peroxyesters, for example hydrogen peroxide, dibenzoyl peroxide, di-t-butyl peroxide, t-butyl hydroperoxide, t-butyl perpivalate and t-butyl peroxy-2-ethylhexanoate and also azo compounds, eg. 2,2'-azobis(2-amidinopropane) dihydrochloride, 2,2'-azobis(2-methylbutyronitrile) and 2,2'-azobis[2-(2-imidazolin-2-yl)propane] dihydrochloride. Of course, initiator mixtures or the known redox initiators can also be used. The polymerization temperature is preferably within the range from 60° to 100° C. Of course, it is also possible to polymerize outside the stated temperature range, in which case the graft polymerization is carried out in sealed apparatus under superatmospheric pressure at higher temperatures, for example within the range from 120° to 140° C.

The initiators are used in the customary amounts, ie. in amounts from for example 0.2 to 5% by weight, based on components (a) and (b).

The graft polymerization can optionally be carried out in the presence of protective colloids or surfactants. These compounds are preferably used whenever the polymers of group (b) are not completely water-soluble but are to be dispersed in water. Suitable protective colloids are for example polyvinylpyrrolidone, copolymers of N-vinylpyrrolidone and vinyl acetate, partially or completely hydrolyzed polyvinyl acetates, cellulose ethers or esters, copolymers of maleic anhydride with vinyl ethers, styrene or 1-alkenes, gelatin, starch or starch esters or ethers.

The term surfactants is to be understood as meaning all those compounds which reduce the surface tension of water, for example alkoxylated alcohols, amines or phenols. If protective colloids are used in the graft polymerization, the amounts are customarily from 0.1 to 10% by weight, based on compounds (a) and (b). Surfactants are used in the same amounts.

To use the process of the invention to prepare graft polymers having low K values, the graft polymerization is advantageously carried out in the presence of regulators. Suitable regulators are for example mercapto compounds such as mercaptoethanol, mercaptopropanol, mercaptobutanol, mercaptoacetic acid, mercaptopropionic acid and alkyl mercaptans having from 4 to 20 carbon atoms in the alkyl group. An example of such compounds is dodecyl mercaptan. Other suitable regulators are halogen compounds such as tetrachloromethane, chloroform and bromotrichloromethane and also allyl compounds such as allyl alcohol, alkylhydroxylamines such as diethylhydroxylamine, disulfides such as cysteine or diethanol disulfide, sulfides, sulfites such as sodium sulfite or sodium bisulfite, hydrophosphites, formic acid, ammonium formate, aldehydes or hydrazine sulfate. If the graft polymerization is carried out in the presence of regulators, it is customary to use from 0.05 to 20% by weight, based on the total amount of the monomers (a) used in the polymerization.

The graft polymers can optionally be modified by preparing them in the presence of monomers having at least two monoethylenically unsaturated nonconjugated double bonds in the molecule. Such compounds are customarily used in polymerizations as crosslinkers. They increase the molecular weight of the copolymers being formed. Suitable crosslinkers of this kind are for example the diacrylates or dimethacrylates of glycols or polyalkylene glycols such as ethylene glycol diacrylate, diethylene glycol dimethacrylate, diethylene glycol diacrylate or the diacrylates of polyalkylene glycols having molecular weights from 300 to 2,000, divinylbenzene, divinyldioxane or triallyl ethers of sugars. If crosslinkers are used in the graft polymerization, the amounts used are preferably from 0.01 to 2% by weight, based on the monomers (a).

The graft polymerization is customarily carried out in an inert gas atmosphere from which oxygen is excluded. During the graft polymerization it is customary to ensure thorough mixing of the reactants. The grafted polyamidoamines or polyethyleneimines of the invention can be freed of undesirable impurities by further steps such as steam treatment or partial distillative removal of the solvent together with other volatiles. In some cases it can be advantageous to subject the graft polymers subsequently to an oxidative treatment. For this purpose the oxidizing agents are preferably made to act on an aqueous solution of graft polymers. Suitable oxidizing agents are hydrogen peroxide, alkyl hydroperoxides such as tert-butyl hydroperoxides or cumene hydroperoxide, per-acids, sodium hypochlorite, sodium perborate, sodium percarbonate or sodium persulfate. Particular preference is given to the use of hydrogen peroxide. If an oxidative aftertreatment is carried out, hydrogen peroxide is used in amounts of from 1 to 50% by weight, based on the graft polymers. The treatment with the oxidizing agents is carried out within the temperature range from 50° to 120° C., a treatment at above 100° C. being usually carried out in apparatus sealed pressure-tight. The graft polymers can be isolated from the solution or dispersion, as the case may be. They have K values from 10 to 250 (determined by the method of H. Fikentscher on a 1% strength aqueous solution at 25° C. and pH 7).

The above-described graft polymers are used as detergent additament for inhibiting dye transfer during washing. Of preference for this purpose are those graft polymers which have a K value within the range from 12 to 90.

The detergents can be pulverulent or else be formulated as liquids. The compositions of detergents can differ greatly. Detergents customarily contain from 2 to 50% by weight of surfactants with or without builders. This applies not only to liquid but also to pulverulent detergents. Detergent formulations customary in Europe, in the U.S.A. and in Japan can be seen for example in table form in Chemical and Engn. News, 67 (1989), 35. Further information on the compositions of detergents can be found in WO-A-90/13581 and Ullmanns Encyklopädie der technischen Chemie, Verlag Chemie, Weinheim 1983, 4th edition, pages 63–160. The detergents may additionally contain a bleaching agent, for example sodium perborate, which if used can be present in the detergent in amounts of up to 30% by weight. Detergents may contain further customary additives, for example complexing agents, opacifiers, optical brighteners, enzymes, perfume oils, other color transfer inhibitors, grayness inhibitors and/or bleach activators.

Detergents based on surfactants with or without builders and other customary ingredients include the graft polymers formed from components (a) and (b) according to the invention in amounts from 0.05 to 10, preferably from 0.25 to 5, % by weight.

The copolymers act as color transfer inhibitors when colored and white textiles are washed together, and are at least partly adsorbed on the sewage sludge of water treatment plants.

In the Examples, the percentages are by weight. The K values were determined by the method of H. Fikentscher, Cellulose-Chemie, 13 (1932), 58–64, 71–74, on a 1% strength solution in water at 25° C. and pH 7.

EXAMPLES

The following polymers are used to provide a comparison with the prior art:

Polyamidoamine 1

In a flask equipped with a stillhead, a stirrer and a nitrogen inlet, 100 g of water were heated under nitrogen to 80° C. At that temperature 150 g of adipic acid were added with stirring, followed by 171 g of a mixture of N-aminopropylethylenediamine and N,N-bis(aminopropyl) ethylenediamine added over one hour, and the reaction mixture was initially heated to 140° C. and then to 170° C., at which the condensation was carried out over 24 hours. During this period, the reaction mixture was stirred and water was distilled off. The reaction mixture was then cooled down to 140° C. and diluted with 200 ml water. This left a clear yellow solution having a non-volatiles content of 54% and a viscosity of 1,100 mPa.s (at 20° C. in a Physica viscometer, measuring cone 24, 35 rpm).

Polyamidoamine 2

In a flask equipped with a stillhead, a stirrer and a nitrogen inlet, 547.6 g of 98% strength diethylenetriamine were heated to 80° C. under nitrogen and admixed over 0.5 hour with 656.6 g of adipic acid added a little at a time. During the addition of the adipic acid the mixture was stirred and initially heated to 130° C. After all the adipic acid had been added, the reaction mixture was heated to 170° C. and water was distilled out of the reaction mixture in the course of 24 hours. The polyamidoamine was cooled down to 135° C. and dissolved in 800 ml of water. This produced a clear yellow solution having a nonvolatiles content of 57% and a viscosity of 1,320 mPa.s (measured at 20° C. in a Physica viscometer, measuring cone 24, 35 rpm).

Polyamidoamine 3

The method of preparation of polyamidoamine 1 was applied to 51 g of adipic acid, 20 g of iminodiacetic acid and 58.5 g of triethylenetetramine. The aqueous solution had a nonvolatiles content of 20% and a viscosity of 520 mPa.s.

Polyethyleneimine 1

Commercial aqueous colorless solution having a density of 1.07 g/l and a solids content of 50.7%. Polyethyleneimine 1 had a molecular weight of 6,500 (determined by light scattering of a 0.1% strength solution in aqueous sodium chloride).

EXAMPLE 1

In a 2 l capacity flask equipped with a stirrer and a device for working under nitrogen, 150 g of polyamidoamine 1 were dissolved in 450 g of water and heated under nitrogen to 85° C. Once that temperature had been reached, the dropwise addition was commenced of 150 g of N-vinylpyrrolidone in 250 g of water and of 3 g of tert-butyl perethylhexanoate in 40 g of ethanol and continued for 3 hours in both cases. On completion of the addition of the polymerization initiator the reaction mixture was stirred at 90° C. for a further 2 hours. The result was a clear, viscous solution having a solids content of 28.4%. The N-vinylpyrrolidone-grafted polyamidoamine had a K value of 38.2.

EXAMPLE 2

Example 1 was repeated with polyamidoamine 1 replaced by the same amount of polyamidoamine 2, affording a clear, viscous solution having a solids content of 28.7%. The N-vinylpyrrolidone-grafted polyamidoamine had a K value of 36.4.

EXAMPLE 3

Example 1 was repeated with the N-vinylpyrrolidone replaced by 150 g of N-vinylimidazole, affording a clear, viscous solution having a solids content of 27%. The N-vinylimidazole-grafted polyamidoamine 1 had a K value of 37.5.

EXAMPLE 4

Example 3 was repeated with polyamidoamine 1 replaced by 150 g of polyamidoamine 2, affording a clear, viscous solution having a solids content of 28.1%. The N-vinylimidazole-grafted polyamidoamine 2 had a K value of 38.0.

EXAMPLE 5

In the apparatus described in Example 1 24 g of N-vinylimidazole in a mixture of 56 g of polyamidoamine 1 in 170 g of water were polymerized in the course of 6 hours by addition of 0.5 g of tert-butyl perethylhexanoate in 10 g of ethanol. The result was a clear, viscous solution having a solids content of 29.5%. The N-vinylimidazole-grafted polyamidoamine 1 had a K value of 29.8.

EXAMPLE 6

In a 1 l capacity flask equipped with a stirrer and a device for working under nitrogen, 79 g of a 50.7% strength solution of polyethyleneimine 1 and 129 g of water were heated to 85° C. under nitrogen. Once that temperature had been reached, the dropwise addition was commenced of 40 g of N-vinylimidazole and of 0.8 g of tert-butyl perethylhexanoate in 10 g of ethanol and continued for 1 hour. On completion of the addition of the polymerization initiator the reaction mixture was stirred at 90° C. for a further 2 hours. The result was a clear, viscous solution having a solids content of 30.2%. The N-vinylimidazole-grafted polyethyleneimine 1 had a K value of 53.1.

EXAMPLE 7

In the apparatus specified in Example 1, a mixture of 100 g of polyamidoamine 1 and 300 g of water was admixed under the polymerization conditions specified in Example 1 with a solution of 233 g of N-vinylimidazole in 475 g of water and a solution of 4.7 g of tert-butyl perethylhexanoate in 40 g of ethanol over 4 hours. The result was a clear, viscous solution having a solids content of 29.3%. The graft polymer thus obtained had a K value of 43.6.

EXAMPLE 8

The method of Example 6 was followed to subject a mixture of 79 g of polyethyleneimine 1 and 129 g of water to graft polymerization with 40 g of N-vinylpyrrolidone. The result was a clear, viscous solution having a solids content of 32.2%. The graft polymer had a K value of 45.8.

EXAMPLE 9

The method of Example 1 was followed to subject a mixture of 100 g of polyamidoamine 1 and 300 g of water, a solution of 233 g of N-vinylpyrrolidone in 475 g of water and a solution of 4.7 g of tert-butyl perethylhexanoate in 40 g of ethanol to a graft polymerization which, deviating from Example 1, took 4 hours. The result was a clear, viscous solution having a solids content of 29.3%. The graft polymer had a K value of 45.9.

EXAMPLE 10

Example 1 was repeated to polymerize 24 g of N-vinylpyrrolidone in a mixture of 56 g of polyamidoamine 1 and 170 g of water. The polymerization initiator used was a solution of 0.5 g of tert-butyl perethylhexanoate in 10 g of ethanol. The N-vinylpyrrolidone and the initiator were added over 3 hours. The result was a clear, viscous solution having a solids content of 30%. The graft polymer had a K value of 29.2.

EXAMPLE 11

In a 1 l capacity flask equipped with a stirrer and a device for working under nitrogen 50 g of polyamidoamine 3 in 250 g of water were heated under nitrogen to 95° C. Once that temperature had been reached, the dropwise addition was commenced of 50 g of N-vinylimidazole and of 1.5 g of sodium persulfate in 50 g of water and continued for 3 hours. On completion of the addition of the polymerization initiator and of the monomer the reaction mixture was stirred for a further 2 hours. The result was a clear, viscous liquid having a solids content of 26.1%. The graft polymer had a K value of 29.8.

EXAMPLE 12

In the apparatus of Example 6 25 g of polyamidoamine 1, 25 g of N-vinylimidazole, 0.4 g of 2,2'-azobis(2-amidinopropane) dihydrochloride and 75 g of water were heated to 85° C. under nitrogen. Once that temperature had been reached, the dropwise addition was commenced of 0.8 g of the azo compound in 50 g of water and continued for 4 hours. On completion of the addition of the polymerization initiator the reaction mixture was stirred at 85° C. for a further 2 hours. The result was a clear, viscous solution having a solids content of 30.0%. The N-vinylimidazole-grafted polyamidoamine 1 had a K value of 37.2.

APPLICATION EXAMPLES

Washing trials

To test the effectiveness white test fabric was washed in a Launderometer together with dyed textiles made of cotton. The dye transfer was measured photometrically. The reflectance values measured on the individual test fabrics were used to determine the respective color strengths, from which the effectiveness of the polymers can be derived. An effectiveness of 100% means that the test fabric retains its original color strength, ie. has not been stained. An effectiveness of 0% means that a test fabric has the same color strength as a swatch washed without the addition of a dye transfer inhibitor.

The textile samples had been dyed with the following dyes:

| Dye | Name | Constitution number |
| --- | --- | --- |
| 1 | C.I. Direct Black 51 | 27720 |
| 2 | C.I. Direct Blue 218 | 24401 |
| 3 | C.I. Direct Black 22 | 35435 |
| 4 | C.I. Direct Red 81 | 28160 |
| 5 | C.I. Direct Blue 71 | 34140 |
| 6 | C.I. Reactive Black 5 | 20505 |
| 7 | C.I. Reactive Blue 19 | 61200 |

| Washing conditions | |
| --- | --- |
| Washing apparatus | Launderometer |
| Washing cycles | 1 |
| Temperature | 60° C. |
| Washing time | 30 min |
| Water hardness | 3 mmol of $Ca^{2+}$, $Mg^{2+}$ (4:1)/l |
| Test fabric | cotton |
| Liquor ratio | 50:1 |
| Amount of liquor | 250 ml |
| Detergent concentration | 7.0 g/l |
| Detergent composition [%] | |
| Zeolite A | 20 |
| Sodium carbonate | 11 |
| Dodecylbenzenesulfonate | 5 |
| Soap | 1.3 |
| $C_{13}/C_{15}$ oxo alcohol x 7 ethylene oxide units | 3.9 |
| Sodium salt of a copolymer of 70% acrylic acid and 30% maleic acid, molecular weight 70,000 | 2.7 |
| Sodium carboxymethylcellulose | 0.4 |
| Water | 7 |
| Polymer as per Table 1 or 2 | 0.5 or 1 |
| Sodium sulfate | ad 100 |

Polymer 1 Polyvinylpyrrolidone, K value 30 (1% strength in $H_2O$), standard polymer for comparison. Polymers of this kind are present as color transfer inhibitors in commercial color detergents.

TABLE 1

| | Use concentration of polymers: 1% Effectiveness [%] | | | | | |
| --- | --- | --- | --- | --- | --- | --- |
| Polymer prepared according to Example | 1 | 2 | 3 | 4 | Polyamido-amine 1 | Polyethy-leneimine 1 |
| Dye 1 | 22.3 | 23.8 | 23.5 | 25.3 | 2.7 | 8.9 |
| Dye 3 | 72.5 | 73.1 | 86.2 | 86.1 | 16.4 | 50.5 |

TABLE 1-continued

| | Use concentration of polymers: 1% Effectiveness [%] | | | | | |
|---|---|---|---|---|---|---|
| Polymer prepared according to Example | 1 | 2 | 3 | 4 | Polyamido-amine 1 | Polyethy-leneimine 1 |
| Dye 4 | 15.4 | 17.7 | 15.3 | 14.9 | 0 | 2.4 |
| Dye 5 | 97.6 | 97.6 | 98.9 | 98.9 | 18.6 | 24.9 |

The results of Table 1 show that the graft polymers of the invention have a distinctly higher effectiveness that their parent polyamidoamines and polyethyleneimines.

TABLE 2

| | Use concentration of polymers: 0.5% Effectiveness [%] | | | | | | |
|---|---|---|---|---|---|---|---|
| Polymer prepared according to Example | 5 | 6 | 7 | 8 | 9 | 10 | Polymer 1 |
| Dye 2 | 74.3 | 61.1 | 85.0 | 50.0 | 33.6 | 53.0 | 34.6 |
| Dye 3 | 63.8 | 85.5 | 90.3 | 72.3 | 78.5 | 63.4 | 14.1 |
| Dye 5 | 92.6 | 95.4 | 97.8 | 91.0 | 95.8 | 72.3 | 91.4 |
| Dye 6 | 39.6 | 46.8 | 40.7 | 29.0 | 19.8 | 37.1 | 3.1 |
| Dye 7 | 19.3 | 48.9 | 15.9 | 41.9 | 15.5 | 21.5 | 0.4 |

The results of Table 2 show that the graft polymers of the invention have a distinctly higher effectiveness than polyvinylpyrrolidone.

Adsorption test

The adsorption tested is that of the polymers of Table 3 on the activated sludge of a biological water treatment plant. Each polymer is dissolved in aqueous activated sludge suspension. The concentration of the polymer is at least 100 mg/l, based on dissolved organic carbon (DOC). The activated sludge concentration is 1 g/l, based on the dry weight. After 48 h the DOC is measured in the supernatant after the sludge has sedimented. Fine particles of activated sludge are removed before the DOC is measured.

$$\text{Degree of elimination in \%} = \frac{\text{original } DOC - \text{final } DOC}{\text{original } DOC} \times 100$$

TABLE 3

| Polymer | Degree of elimination [%] |
|---|---|
| Polymer 1 | <5 |
| Example 1 | 27 |
| Example 3 | 43 |

The Examples show that the polymers of the invention possess distinctly improved elimination characteristics on sewage sludge compared with polyvinylpyrrolidone.

We claim:

1. Grafted polyamidoamines and grafted polyethyleneimines obtained by free-radically initiated polymerization of (a) 1-vinylpyrrolidone, 1-vinyltriazole, or 1-vinylimidazoles of the formula

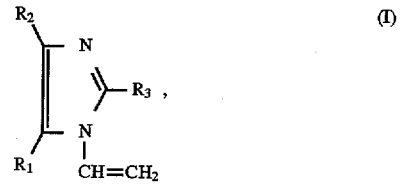

where $R_1$, $R_2$, and $R_3$ are independently H, $CH_3$ or $C_2H_5$, mixtures of said monomers or mixtures of at least one of said monomers with up to 20% by weight of other monoethylenically unsaturated monomers in the presence of (b) water-soluble or -dispersible polyamidoamines, polyethyleneimines or mixtures thereof in a weight ratio of (a):(b) from 5:95 to 95:5.

2. A process for preparing the grafted polyamidoamines and grafted polyethyleneimines as claimed in claim 1, which comprises free-radically polymerizing (a) 1-vinylpyrrolidone, 1-vinyltriazole, or 1-vinylimidazoles of the formula

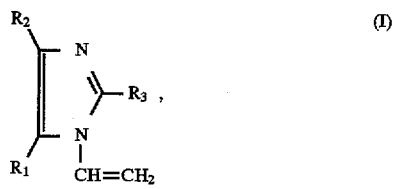

where $R_1$, $R_2$, and $R_3$ are independently H, $CH_3$ or $C_2H_5$ and n is from 1 to 3, mixtures of said monomers or mixtures of at least one of said monomers with up to 20% by weight of other monoethylenically unsaturated monomers in the presence of (b) water-soluble or -dispersible polyamidoamines, polyethyleneimines or mixtures thereof in a weight ratio of (a):(b) from 5:95 to 95:5.

3. A detergent composition comprising a surfactant and from 0.05 to 10% by weight of the grafted polyamidoamine and/or the grafted polyethyleneimine of claim 1.

4. A grafted polyamidoamine obtained by free-radical initiated polymerization of a mixture comprising (a) 1-vinylpyrrolidone; and (b) water-soluble or -dispersible polyamidoamines, in a weight ratio of (a):(b) of from 5:95 to 95:5.

5. A method of washing dyed articles, comprising washing a dyed article in the presence of an effective dye transfer-inhibiting amount of the grafted polyamidoamines or grafted polyethyleneimines of claim 1.

* * * * *